United States Patent
Imai et al.

(10) Patent No.: US 10,819,942 B2
(45) Date of Patent: Oct. 27, 2020

(54) IMAGE DISPLAY APPARATUS, CONTROL METHOD OF IMAGE DISPLAY APPARATUS, AND PROGRAM

(71) Applicant: SEIKO EPSON CORPORATION, Tokyo (JP)

(72) Inventors: Shun Imai, Matsumoto (JP); Takaaki Ozawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/258,736

(22) Filed: Jan. 28, 2019

(65) Prior Publication Data
US 2019/0238790 A1 Aug. 1, 2019

(30) Foreign Application Priority Data
Jan. 29, 2018 (JP) ................................. 2018-012444

(51) Int. Cl.
*H04N 5/74* (2006.01)
*G03B 21/14* (2006.01)
*G06F 3/0482* (2013.01)

(52) U.S. Cl.
CPC ............... *H04N 5/74* (2013.01); *G03B 21/14* (2013.01); *G06F 3/0482* (2013.01)

(58) Field of Classification Search
CPC ........ G03B 21/14; G06F 3/0482; H04N 5/74; H04N 9/3147; H04N 9/3179

USPC .......................................................... 715/763
See application file for complete search history.

(56) References Cited

U.S. PATENT DOCUMENTS

| 10,048,907 B2* | 8/2018 | Masumoto ............ G06F 3/1203 |
| 2016/0077687 A1* | 3/2016 | Watanabe ............ H04N 1/0035 715/763 |
| 2019/0197621 A1* | 6/2019 | Sand ...................... G06Q 40/04 |
| 2019/0238790 A1* | 8/2019 | Imai ..................... H04N 9/3179 |
| 2020/0026397 A1* | 1/2020 | Wohlstadter ........... G16C 20/10 |

FOREIGN PATENT DOCUMENTS

| JP | H07-141137 A | 6/1995 |
| JP | 2002-323946 A | 11/2002 |
| JP | 2013-232120 A | 11/2013 |

* cited by examiner

*Primary Examiner* — Tony O Davis
(74) *Attorney, Agent, or Firm* — Oliff PLC

(57) ABSTRACT

A projector includes a control unit that, when an operation unit receives an operation of selecting an uppermost menu item belonging to an uppermost layer, displays a middle menu item belonging to a middle layer, and, when the operation unit receives an operation of selecting the middle menu item, displays a lowermost menu item belonging to a lowermost layer. While the lowermost menu item is displayed, when the operation unit receives a short-press operation, the control unit displays the middle menu item, and, while the lowermost menu item is displayed, when the operation unit receives a long-press operation, the control unit displays the uppermost menu item.

5 Claims, 5 Drawing Sheets

IMAGE DISPLAY APPARATUS, CONTROL METHOD OF IMAGE DISPLAY APPARATUS, AND PROGRAM

The entire disclosure of Japanese Patent Application No. 2018-012444, filed Jan. 29, 2018 is expressly incorporated by reference herein.

BACKGROUND

1. Technical Field

The present invention relates to an image display apparatus, control method of image display apparatus, and program.

2. Related Art

In related art, a technique of displaying menu items belonging a predetermined layer is known (for example, see Patent Document 1 (JP-A-2002-323946). Patent Document 1 discloses a technique of, when an operator moves the mode to a menu mode within a predetermined period after the menu mode is ended, of displaying menu items belonging to the layer last displayed in the previous menu mode and, when the operator moves the mode to the menu mode after the predetermined period, displaying menu items belonging to the uppermost layer.

However, in Patent Document 1, to display the menu items belonging to the uppermost layer, it is necessary to wait for a lapse of the predetermined period or move the layer to the upper layer one at a time, and time is taken to display the menu items belonging to the uppermost layer.

SUMMARY

An advantage of some aspects of the invention is to shorten the time taken to display menu items belonging to the uppermost layer.

An image display apparatus according to an aspect of the invention includes a display unit that displays a menu item, an operation unit that receives an operation, and a control unit that, when the operation unit receives an operation of selecting a first menu item belonging to an uppermost first layer, allows the display unit to display a second menu item belonging to a second layer lower than the first layer, and, when the operation unit receives an operation of selecting the second menu item, allows the display unit to display a third menu item belonging to a third layer lower than the second layer, wherein, while the display unit displays the third menu item, when the operation unit receives a first operation, the control unit allows the display unit to display the second menu item, and, while the third menu item is displayed, when the operation unit receives a second operation, the control unit allows the display unit to display the first menu item.

According to the configuration, while the the third menu item is displayed, when the second operation is received, the first menu item is displayed, and thereby, it is not necessary to wait for a lapse of a predetermined period or move the layer to the upper layer one at a time for displaying the menu item belonging to the uppermost layer. Accordingly, the time taken to display the menu item belonging to the uppermost layer may be shortened. Further, the operations received by the operation unit are made different, and thereby, the menu items belonging to the different upper layers may be displayed and usability of the image display apparatus for displaying the menu item belonging to the upper layer is improved.

The image display apparatus may further include a memory unit that stores an operation sequence in which the first menu item, the second menu item, and the third menu item are operated, wherein, while the first menu item is displayed, when the operation unit receives the second operation, the control unit may allow the display unit to display the third menu item according to the operation sequence stored by the memory unit.

According to the configuration, the third menu item belonging to the third layer is displayed according to the operation sequence stored by the memory unit, and thereby, the menu item belonging to the lower layer may be displayed without moving the layer to the lower layer one at a time and the time taken to display the menu item belonging to the lower layer may be shortened.

In the image display apparatus, the memory unit may store the operation sequence with respect to each first menu item.

According to the configuration, the operation sequence is stored with respect to each first menu item, and thereby, the menu item belonging to the lower layer may be appropriately displayed with respect to each first menu item.

In the image display apparatus, the first operation may be an operation on a first button of the operation unit, and the second operation may be an operation on the first button and different from the first operation.

According to the configuration, the first operation is the operation on the first button and the second operation is the operation on the first button and different from the first operation, and thereby, it is not necessary to provide operation buttons respectively corresponding to the types of operations. Accordingly, cost of the image display apparatus may be reduced with improved usability of the image display apparatus.

A control method of an image display apparatus according to an aspect of the invention is when receiving an operation of selecting a first menu item belonging to an uppermost first layer, displaying a second menu item belonging to a second layer lower than the first layer, when receiving an operation of selecting the second menu item, displaying a third menu item belonging to a third layer lower than the second layer and when receiving a first operation while displaying the third menu item, displaying the second menu item, and, when receiving a second operation while displaying the third menu item, displaying the first menu item.

According to the control method, while the third menu item is displayed, when the second operation is received, the first menu item is displayed, and thereby, it is not necessary to wait for a lapse of a predetermined period or move the layer to the upper layer one at a time for displaying the menu item belonging to the uppermost layer. Accordingly, the time taken to display the menu item belonging to the uppermost layer may be shortened. Further, the operations received by the operation unit are made different, and thereby, the menu items belonging to the different upper layers may be displayed and usability of the image display apparatus for displaying the menu item belonging to the upper layer is improved.

A program according to an aspect of the invention is a program to be executed by a control unit of an image display apparatus including a display unit that displays a menu item and an operation unit that receives an operation, the program allowing the control unit to, when the operation unit receives an operation of selecting a first menu item belonging to an uppermost first layer, allow the display unit to display a second menu item belonging to a second layer lower than the first layer, and, when the operation unit receives an operation of selecting the second menu item, allow the display unit to display a third menu item belonging to a third layer lower than the second layer, while the display unit displays the third menu item, when the operation unit receives a first operation, allow the display unit to display the second menu item, and, while the third menu item is displayed, when the operation unit receives a second operation, allow the display unit to display the first menu item.

According to the program, while the third menu item is displayed, when the second operation is received, the first menu item is displayed, and thereby, it is not necessary to wait for a lapse of a predetermined period or move the layer to the upper layer one at a time for displaying the menu item belonging to the uppermost layer. Accordingly, the time taken to display the menu item belonging to the uppermost layer may be shortened. Further, the operations received by the operation unit are made different, and thereby, the menu items belonging to the different upper layers may be displayed and usability of the image display apparatus for displaying the menu item belonging to the upper layer is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
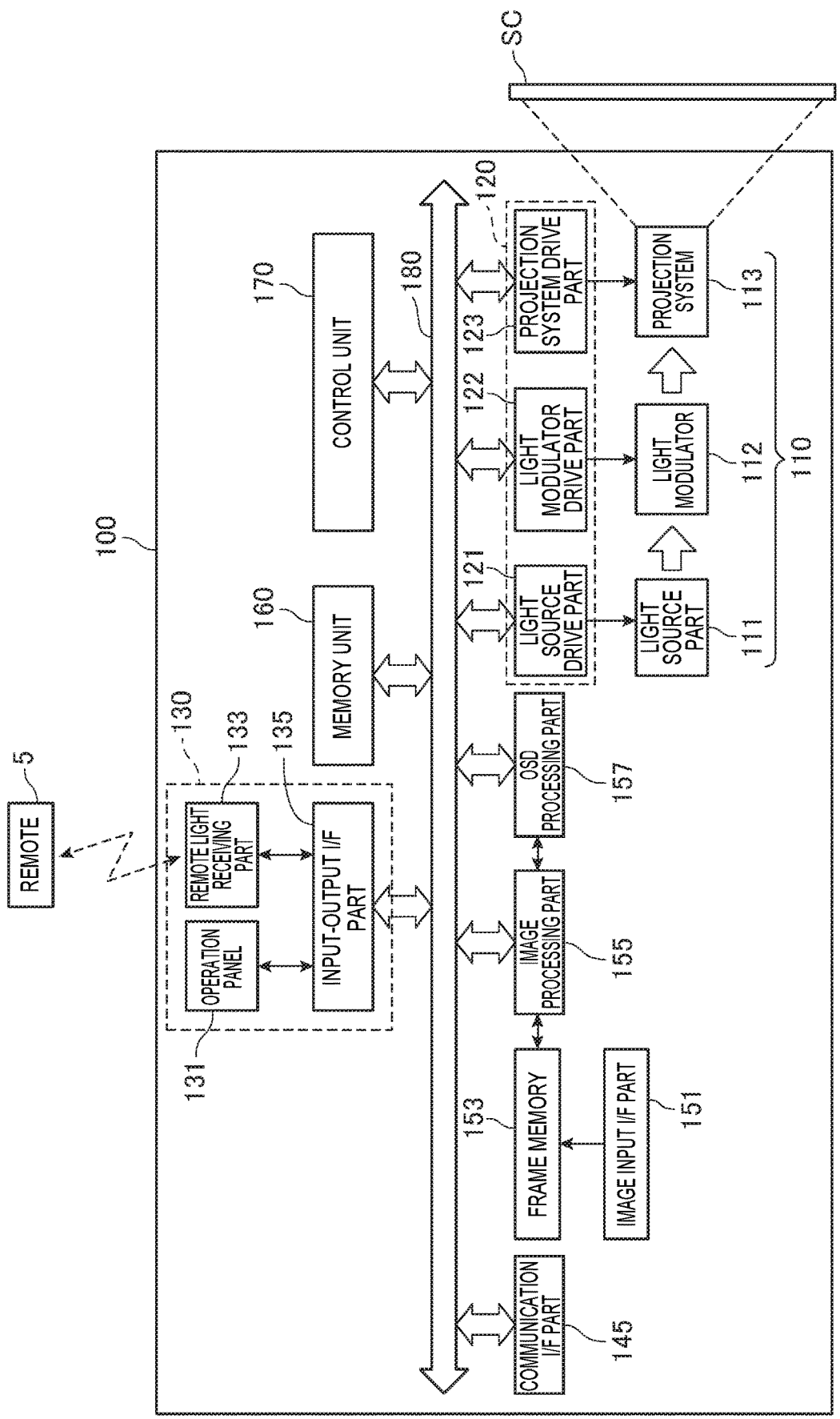
FIG. 1 shows a configuration of a projector.

FIG. 1 shows a configuration of a projector 100 (image display apparatus).

The projector 100 projects image light to a projection object and forms an image based on image data on a surface of the projection object. The projection object on which the projector 100 projects the image may be a flat surface, curved surface, or uneven surface, however, in the embodiment, the case of projection on a screen SC formed by a flat surface is exemplified. For the screen SC, a fixed flat surface such as a wall surface may be used, or a suspended or standing screen may be used. In the projector 100, a projection opening portion (not shown) for projection of image light is provided. The projection opening portion is an opening portion from which a projection system 113 provided inside of the projector 100 radiates light.

The projector 100 includes an image input I/F part 151. The image input I/F part 151 includes at least one of a connector for connecting cables and an interface circuit (both not shown).

The image input I/F part 151 receives a signal externally transmitted. The image input I/F part 151 takes image data and synchronizing signals (vertical synchronizing signal and horizontal synchronizing signal) contained in the received signal. The image input I/F part 151 outputs the taken image data to a frame memory 153 and stores the data in the frame memory 153, and outputs the synchronizing signals to an image processing part 155 and a control unit 170. The image processing part 155 performs processing on the image data in synchronization with the synchronizing signals. Further, the control unit 170 controls the operation of the respective parts forming the projector 100.

As the interface of the image input I/F part 151, e.g. the following interfaces may be used.

As the interface, an interface that can digitally transmit picture signals and sound signals such as HDMI (registered trademark (High-Definition Multimedia Interface)), Displayport, MHL (Mobile High-definition Link, registered trademark), HDBaseT (registered trademark), Thunderbolt (registered trademark), USB Type-C, or 3G-SDI (Serial Digital Interface) may be used. Or, as the interface, an interface for data communication such as Ethernet (registered trademark), IEEE1394, or USB may be used. Or, analog video signals may be transmitted and received with analog video terminals such as RCA terminals, VGA terminals, S terminals, or D terminals in an external apparatus and the projector 100.

The projector 100 includes a projection unit 110 that forms and projects an optical image on the screen SC, and a drive unit 120 that drives the projection unit 110. The projection unit 110 includes a light source part 111, a light modulator 112, and the projection system 113. Further, the drive unit 120 includes a light source drive part 121, a light modulator drive part 122, and a projection system drive part 123. The projection unit 110 corresponds to "display unit" according to the invention.

The light source part 111 includes a light source such as a xenon lamp, ultrahigh-pressure mercury lamp, LED (Light Emitting Diode), or laser light source. Further, the light source part 111 may include a reflector and an auxiliary reflector that guide the light emitted by the light source to the light modulator 112. Furthermore, the light source part 111 may include a lens group for enhancing optical properties of the projection light, polarizer, dimmer that reduces the amount of light emitted by the light source in a path to the light modulator 112, or the like (all not shown).

The light source part 111 is driven by the light source drive part 121. The light source drive part 121 is connected to a bus 180 and turns on or off the light source of the light source part 111 according to control by the control unit 170, which will be described later, connected to the same bus 180.

The light modulator 112 includes e.g. three liquid crystal panels corresponding three primary colors of RGB. The light emitted by the light source part 111 is separated into three color lights of RGB by a dichroic mirror, reflection mirror, relay lens, etc. (all not shown), and entered into the liquid crystal panels of the corresponding colors. The three liquid crystal panels are transmissive liquid crystal panels and modulate the transmitted lights and generate image lights. The image lights passing through the respective liquid crystal panels and modulated are combined by a light combining system such as a cross dichroic prism and output to the projection system 113.

The light modulator 112 is driven by the light modulator drive part 122. The light modulator drive part 122 is connected to the bus 180 and drives the light modulator 112 according to the control of the control unit 170.

The light modulator drive part 122 generates drive signals for driving the liquid crystal panels with respect to each color of R, G, B based on the image data input from the image processing part 155. The light modulator drive part 122 drives the liquid crystal panels of the corresponding colors based on the generated R, G, B drive signals and draws images on the respective liquid crystal panels.

The projection system 113 includes a lens group that projects the image light modulated by the light modulator 112 in a direction of the screen SC and forms an image on the screen SC. Further, the projection system 113 may include a zooming mechanism for scaling and focus adjustment of the projected image on the screen SC and a focusing mechanism for focus adjustment.

The projection system 113 is driven by the projection system drive part 123. The projection system drive part 123 includes e.g. a motor and drives the motor according to the control by the control unit 170 and adjusts zoom and focus.

The projector 100 includes an operation unit 130. The operation unit 130 includes an operation panel 131, a remote light receiving part 133, and an input-output I/F part 135.

On the operation panel 131 that functions as a user interface, various operation buttons (buttons) are provided.

Figure 2:
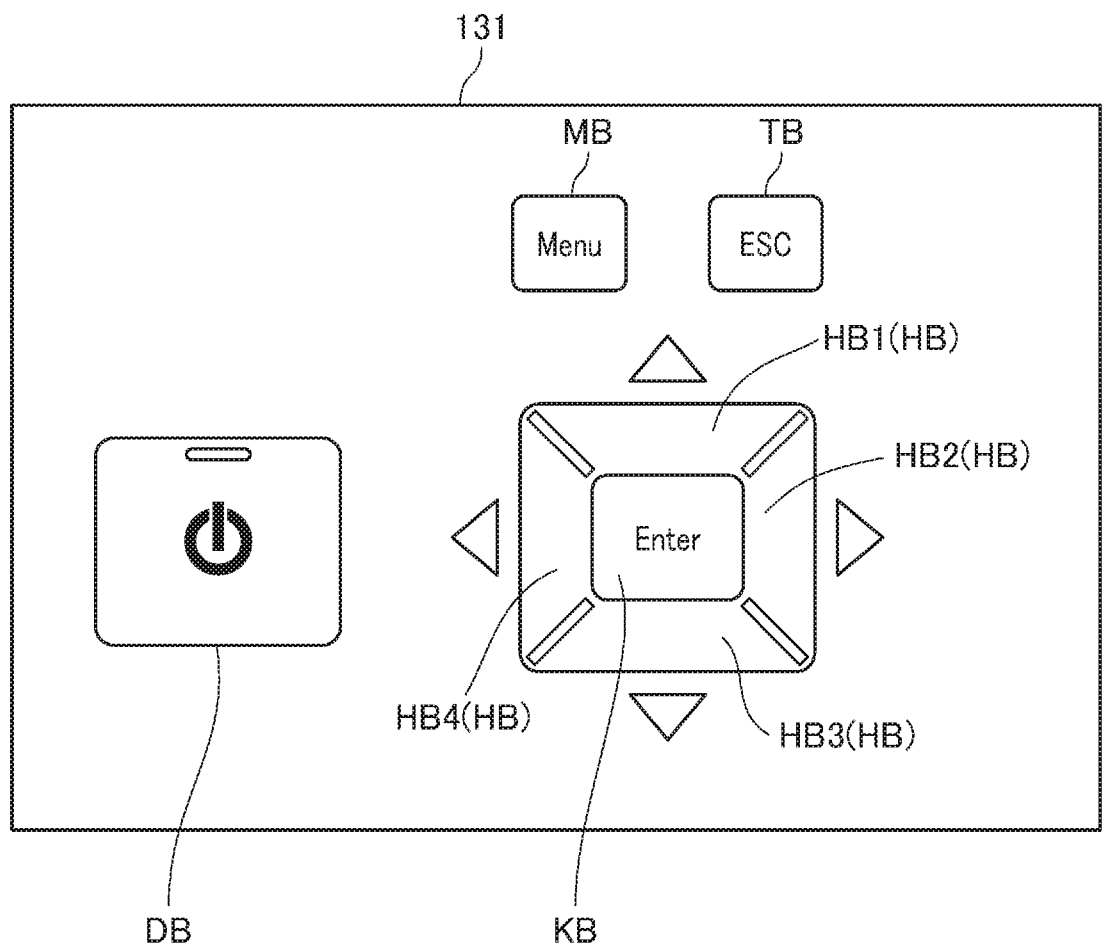
FIG. 2 shows an example of an operation panel.

FIG. 2 shows an example of the operation panel 131.

As shown in FIG. 2, on the operation panel 131, as the operation buttons, a power button DB for switching on/off of the power, a menu button MB for displaying an OSD (onscreen display) menu window for various settings on the screen SC, an enter button KB for settling an item selected on the OSD menu window, four direction buttons HB1 (HB), HB2 (HB), HB3 (HB), HB4 (HB), and an escape button TB for canceling a predetermined operation.

The operation panel 131 shown in FIG. 2 is just an example and may further include various buttons. Further, the shapes, arrangement, etc. of the respective operation buttons of the operation panel 131 are not limited to the respective operation buttons shown in FIG. 2. Furthermore, the operation panel 131 may be a liquid crystal panel and display various buttons with which the projector 100 can be operated.

The input-output I/F part 135 is connected to the operation panel 131, the remote light receiving part 133, and the bus 180. When the operation button is operated, the input-output I/F part 135 outputs an operation signal corresponding to the operated operation button to the control unit 170.

The remote light receiving part 133 for receiving an infrared signal receives an infrared signal transmitted from a remote 5 that functions as a user interface. On the remote 5, the same operation buttons as the operation buttons provided on the operation panel 131 are provided. The remote light receiving part 133 decodes the received infrared signal, and generates and outputs an operation signal representing details of the operation on the remote 5 to the control unit 170.

The projector 100 includes a communication interface part 145. The communication interface part 145 transmits and receives various kinds of data between an external apparatus and itself according to a predetermined wireless communication standard under the control of the control unit 170. As described above, the predetermined wireless communication standard includes e.g. a standard of wireless LAN, Bluetooth (registered trademark), or the like.

The projector 100 includes an image processing system. The image processing system is configured with the control unit 170 that performs integrated control of the whole projector 100 at the center, and additionally includes the frame memory 153, the image processing part 155, and a memory unit 160. The control unit 170, the image processing part 155, and the memory unit 160 are connected to be mutually communicable via the bus 180.

The frame memory 153 includes a plurality of banks. Each bank has memory capacity in which one frame of image data can be written. The frame memory 153 is formed by e.g. an SDRAM (Synchronous Dynamic Random Access Memory). The SDRAM is a DRAM that reads and writes data in synchronization with clock.

The image processing part 155 performs processing of e.g. resolution conversion (scaling) processing or resize processing, distortion correction, shape correction processing, digital zoom processing, adjustment of tone and brightness of images, etc. The image processing part 155 executes processing designated by the control unit 170 and performs processing using parameters input from the control unit 170 as appropriate. Obviously, the image processing part 155 can execute a combination of pieces of the processing.

The image processing part 155 reads the processed image data from the frame memory 153 and outputs the data to an OSD processing part 157.

The OSD processing part 157 performs processing for superimposing the OSD menu window as a menu window for various settings on the image represented by the image data input from the image processing part 155 according to the control by the control unit 170. The OSD processing part 157 includes an OSD memory (not shown) and stores image data representing figures, fonts, etc. for forming the menu image. When the control unit 170 gives a command to superimpose the menu image, the OSD processing part 157 reads necessary image data from the OSD memory and generates menu image data for forming the designated menu image. Then, the OSD processing part 157 combines the menu image data with the image data input from the image processing part 155 so that the menu image may be superimposed in a predetermined position on the image represented by the image data input from the image processing part 155. The combined image data with the menu image data combined is output to the light modulator drive part 122. Note that, in the case where no command to superimpose the OSD menu window is given from the control unit 170, the OSD processing part 157 outputs the image data input from the image processing part 155 to the light modulator drive part 122 without change.

The memory unit 160 is e.g. an auxiliary memory device such as a hard disk device. The memory unit 160 can be replaced by a semiconductor memory such as a flash memory or EEPROM (Electrically Erasable Programmable ROM) or an optical disk such as a CD (Compact Disc), DVD (Digital Versatile Disc), or BD (Blue-ray (registered trademark) Disc). The memory unit 160 stores various kinds of data including control programs to be executed by the control unit 170 and parameters to be used for image processing executed by the image processing part 155. Further, the memory unit 160 stores image data. The projector 100 reads the image data from the memory unit 160 and performs image processing thereon, and projects the processed image data on the screen SC by the projection unit 110.

The control unit 170 includes a CPU, ROM, RAM, and other peripheral circuits (all not shown) as hardware. The CPU is a processor that executes arithmetic processing and executes arithmetic processing according to the control programs stored in the ROM and the memory unit 160. The ROM is a nonvolatile memory and stores e.g. control programs and arithmetic data. The RAM is used as a work area for temporary storage of the control programs and the arithmetic data to be executed by the processor.

In the embodiment, the control unit 170 includes the single processor (CPU) and the function of the control unit 170 is realized by the processor executing processing according to the control program, however, the function of the control unit 170 may be realized by a plurality of processors or semiconductor chips. For example, the control unit 170 may further include a co-processor such as an SoC (System-on-a-Chip), MCU (Micro Control Unit), or FPGA (Field-Programmable Gate Array). Or, the control unit 170 may perform various kinds of control by allowing both the CPU and the co-processor to cooperate or selectively using one of them.

The control unit 170 controls the image processing part 155, the OSD processing part 157, the drive unit 120, etc. to project an image on the screen SC. Specifically, the control unit 170 controls the image processing part 155 to allow the image processing part 155 to process image data developed in the frame memory 153. In this regard, the control unit 170 reads the parameters necessary for the processing by the image processing part 155 from the memory unit 160 and outputs the parameters to the image processing part 155. Further, the control unit 170 controls the OSD processing part 157 to allow the OSD processing part 157 to process the image data input from the image processing part 155. When the operation unit 130 receives an operation of displaying the OSD menu window, the control unit 170 allows the OSD processing part 157 to perform processing to superimpose the OSD menu window.

The control unit 170 controls the light source drive part 121 to turn on the light source of the light source part 111 and adjust the brightness of the turned on light source. Further, the control unit 170 controls the light modulator drive part 122 to draw an image on the liquid crystal panel of the light modulator 112. Furthermore, the control unit 170 controls the projection system drive part 123 to drive the motor and adjust zoom and focus of the projection system 113.

The OSD menu window displayed on the screen SC by the projection by the projection unit 110 includes a plurality of layers and a plurality of menu items MK belong to each layer. The layers of the OSD menu window of the embodiment are roughly divided into three of an uppermost layer (first layer) as a layer at the top, a lowermost layer (third layer) as a layer at the bottom, and a middle layer (second layer) as a layer between the uppermost layer and the lowermost layer. The middle layer is a layer lower than the uppermost layer and upper than the lowermost layer.

Figure 3:
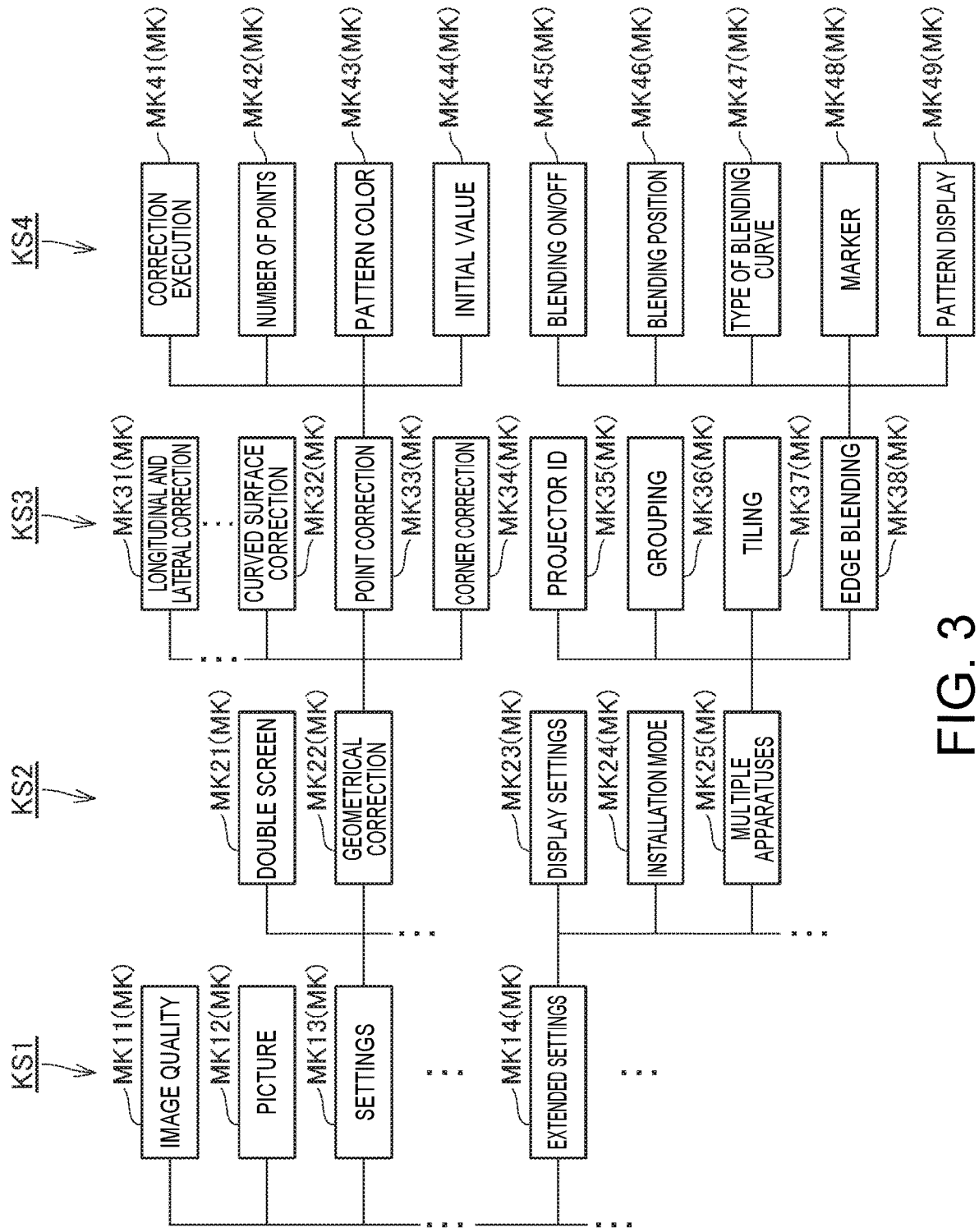
FIG. 3 shows an example of layers and menu items of the layers.

FIG. 3 shows an example of the layers of the OSD menu window and the menu items MK belonging to the respective layers.

In FIG. 3, there are four layers of the OSD menu window at the maximum.

The first layer KS1 shown in FIG. 3 is the uppermost layer. The menu items MK belonging to the first layer KS1 are items formed by the most rough classification of the menu type and the menu items MK belonging to the uppermost layer (hereinafter, referred to as uppermost menu items MK) (first menu items). In FIG. 3, four menu items MK11, MK12, MK13, MK14 are representatively shown as the menu items MK belonging to the first layer KS1.

The menu item MK11 is an item for displaying menu items MK relating to image quality. The menu item MK12 is an item for displaying menu items MK relating to pictures. The menu item MK13 is an item for displaying menu items MK relating to settings except extended settings. The menu item MK14 is an item for displaying menu items MK relating to extended settings.

The menu items MK belonging to the second layer KS2 are items formed by fine classification of the single menu item MK belonging to the first layer KS1. The second layer KS2 corresponds to the middle layer or the lowermost layer by the single menu item MK belonging to the second layer KS2. In FIG. 3, there are items formed by the finer classification of the menu item MK belonging to the second layer KS2. Therefore, in FIG. 3, the two second layers KS2 are exemplified and both of the second layers KS2 correspond to the middle layers.

The menu items MK belonging to the second layer KS2 are menu items MK belonging to the middle layer (hereinafter, referred to as middle menu items MK) (second menu items) in FIG. 3. In FIG. 3, five menu items MK21, MK22, MK23, MK24, MK25 are representatively shown as the menu items MK belonging to the second layers KS2.

The menu items MK21, MK22 are items formed by fine classification of the menu item MK13 belonging to the uppermost layer. The menu item MK21 is an item for displaying menu items MK relating to double-screen display for splitting the projection screen and displaying two images. The menu item MK22 is an item for displaying menu items MK relating to geometrical correction on the projected image.

The menu items MK23, MK24, MK25 are items formed by fine classification of the menu item MK14 belonging to the uppermost layer.

The menu item MK23 is an item for displaying menu items MK relating to display of the projector 100. The menu item MK24 is an item for displaying menu items MK relating to installation of the projector 100. The menu item MK25 is an item for displaying menu items MK relating to projection by a plurality of the projectors 100 arranged side by side.

The menu items MK belonging to the third layer KS3 are items formed by fine classification of the single menu item MK belonging to the second layer KS2. The third layer KS3 corresponds to the middle layer or the lowermost layer by the single menu item MK belonging to the third layer KS3. In FIG. 3, there are items formed by the finer classification of the menu item MK belonging to the third layer KS3. Therefore, in FIG. 3, the two third layers KS3 are exemplified and both of the third layers KS3 correspond to the middle layers.

The menu items MK belonging to the third layer KS3 are middle menu items MK in FIG. 3. In FIG. 3, eight menu items MK31, MK32, MK33, MK34, MK35, MK36, MK37, MK38 are representatively shown as the menu items MK belonging to the third layers KS3.

The menu items MK31, MK32, MK33, MK34 are items formed by fine classification of the menu item MK22. The menu item MK31 is an item for displaying menu items MK relating to longitudinal and lateral shape correction on the projected image. The menu item MK32 is an item for displaying menu items MK relating to curved surface correction as shape correction on an image projected on a curved surface. The menu item MK33 is an item for displaying menu items MK relating to point correction as shape correction of the projected image by adjustment of points arranged in a lattice form. The menu item MK34 is an item for displaying menu items MK relating to corner correction as shape correction of corners of the projected image.

The menu items MK35, MK36, MK37, MK38 are menu items MK formed by fine classification of the menu item MK25. The menu item MK35 is an item for setting IDs for identification of the plurality of projectors 100 when the projectors 100 are operated from the remote 5. The menu item MK36 is an item for grouping a plurality of projectors 100 according to a predetermined criterion. The menu item MK37 is an item for displaying menu items MK relating to tiling projection by a plurality of projectors 100. The menu item MK38 is an item for displaying menu items MK relating to edge blending processing.

The fourth layer KS4 is the lowermost layer. The menu items MK belonging to the fourth layer KS4 are items formed by the finest classification of the single menu item MK belonging to the first layer KS1, and are menu items MK belonging to the lowermost layer (hereinafter, referred to as lowermost menu items MK) (third menu items).

In FIG. 3, nine menu items MK41, MK42, MK43, MK44, MK45, MK46, MK47, MK48, MK49 are representatively shown as the menu items MK belonging to the fourth layers KS4.

The menu items MK41, MK42, MK43, MK44 are items formed by fine classification of the menu item MK33 belonging to the third layer KS3. The menu item MK41 is an item MK for executing the point correction. The menu item MK42 is an item MK for setting the number of intersections (the number of points) at the point correction. The menu item MK43 is an item MK for setting the display color of grids in the point correction. The menu item MK44 is an item MK for cancelling the executed point correction.

The menu items MK45, MK46, MK47, MK48, MK49 are items formed by fine classification of the menu item MK38 belonging to the third layer KS3. The menu item MK45 is an item MK for setting on/off of the edge blending. The menu item MK46 is an item MK for setting a start position in which the edge blending is started. The menu item MK47 is an item MK for setting a type of curve of the edge blending. The menu item MK48 is an item MK for displaying marks for alignment of the projector 100. The menu item MK49 is an item MK for displaying a test pattern.

Figure 4:
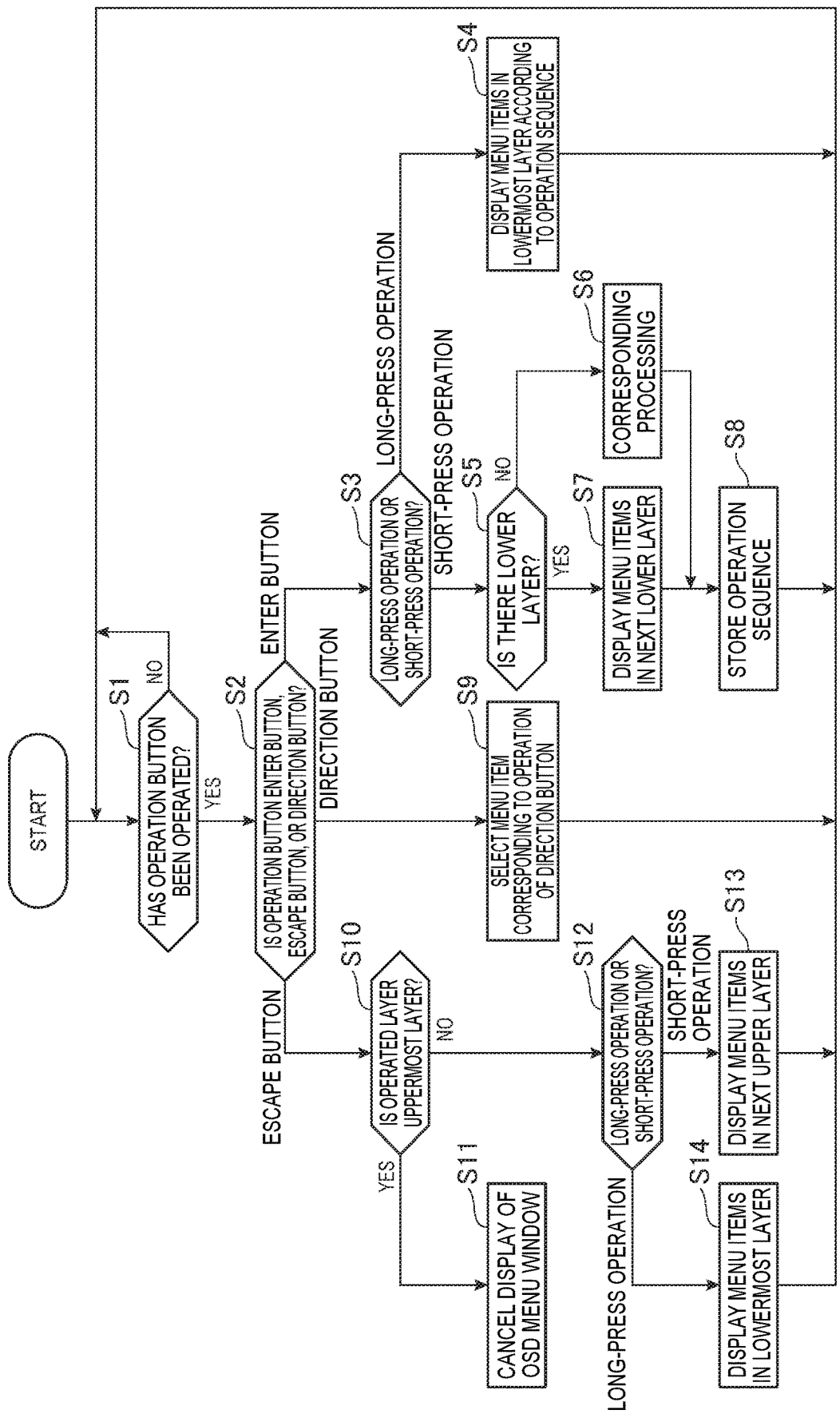
FIG. 4 is a flowchart showing actions of the projector.

FIG. 4 is a flowchart showing actions of the projector 100 according to the embodiment.

It is assumed that the OSD menu window is displayed on the screen SC at the start of the flowchart shown in FIG. 4.

The control unit 170 of the projector 100 determines whether or not the operation button of the operation panel 131 has been operated based on input of the operation signal from the operation unit 130 (step S1). If the control unit 170 determines that the operation button has not been operated (step S1: NO), the unit returns the processing to step S1 and monitors operation on the operation button.

On the other hand, if the control unit 170 determines that the operation button has been operated (step S1: YES), the unit determines if the operated operation button is the enter button KB, the escape button TB, or the direction button HB based on the operation signal input from the operation unit 130 (step S2).

If the control unit 170 determines that the operated operation button is the enter button KB (step S2: "enter button"), the unit determines whether the operation on the enter button KB is a long-press operation (second operation) or short-press operation (first operation) (step S3). The long-press operation is an operation of pressing down the operation button for a longer time than that of the short-press operation. The short-press operation is an operation of pressing down the operation button for a shorter time than that of the long-press operation.

If the control unit 170 determines that the operation on the enter button KB is the long-press operation (step S3: "long-press operation"), the unit displays the menu items MK belonging to the lowermost layer based on an operation sequence stored in the memory unit 160 (step S4). The operation sequence refers to a sequence in which the menu items MK are operated. For example, when the menu items MK13, MK22, MK33, MK41 are sequentially operated, the operation sequence is the order of the items. Note that, when the operation sequence is stored in the memory unit 160, the control unit 170 displays the menu items MK in the fourth layer KS4 to which the menu item MK41 belongs at step S4.

On the other hand, if the control unit 170 determines that the operation on the enter button KB is the short-press operation (step S3: "short-press operation"), the unit determines whether or not there is a lower layer in the layer to which the menu item MK selected by the operation of the enter button KB belongs (step S5).

If the control unit 170 determines that there is no lower layer in the layer to which the menu item MK selected by the operation of the enter button KB belongs (step S5: NO), the unit executes processing corresponding to the selected menu item MK (step S6). Then, the control unit 170 stores the operation sequence of the menu items MK selected by the operation of the enter button KB in the memory unit 160 (step S8).

On the other hand, if the control unit 170 determines that there is a lower layer in the menu item MK selected by the operation of the enter button KB (step S5: YES), the unit displays the menu items MK belonging to the lower layer (step S7). Then, the control unit 170 stores the operation sequence of the menu items MK operated for displaying the menu items MK at step S7 in the memory unit 160 (step S8).

Returning to the description of step S2, if the control unit 170 determines that the operated operation button is the direction button HB (step S2: "direction button"), the unit selects the menu item MK corresponding to the operation of the direction button HB in the layer in which the direction button HB has been operated (step S9). The selection here is selection of an operation object of the enter button KB.

Returning to the description of step S2, if the control unit 170 determines that the operated operation button is the escape button TB (step S2: "escape button"), the unit determines whether or not the layer in which the escape button TB has been operated is the uppermost layer (step S10).

If the control unit 170 determines that the layer in which the escape button TB has been operated is the uppermost layer (step S10: YES), the unit cancels display of the OSD menu window (step S11).

On the other hand, if the control unit 170 determines that the layer in which the escape button TB has been operated is not the uppermost layer (step S10: NO), the unit determines whether the operation on the escape button TB is the long-press operation or short-press operation (step S12).

If the control unit 170 determines that the operation on the escape button TB is the short-press operation (step S12: "short-press operation"), the unit displays the menu items MK belonging to the next upper layer corresponding to the menu item MK selected by the operation of the escape button TB (step S13).

On the other hand, if the control unit 170 determines that the operation on the escape button TB is the long-press operation (step S12: "long-press operation"), the unit displays the menu items MK belonging to the uppermost layer (step S13).

As below, referring to FIGS. 4 and 5, the actions of the projector 100 before the projector 100 executes the processing corresponding to the menu item MK41 belonging to the fourth layer KS4, then, executes the processing corresponding to the menu item MK45 belonging to the other fourth layer KS4, and executes the processing corresponding to the menu item MK41 again will be explained.

Figure 5:
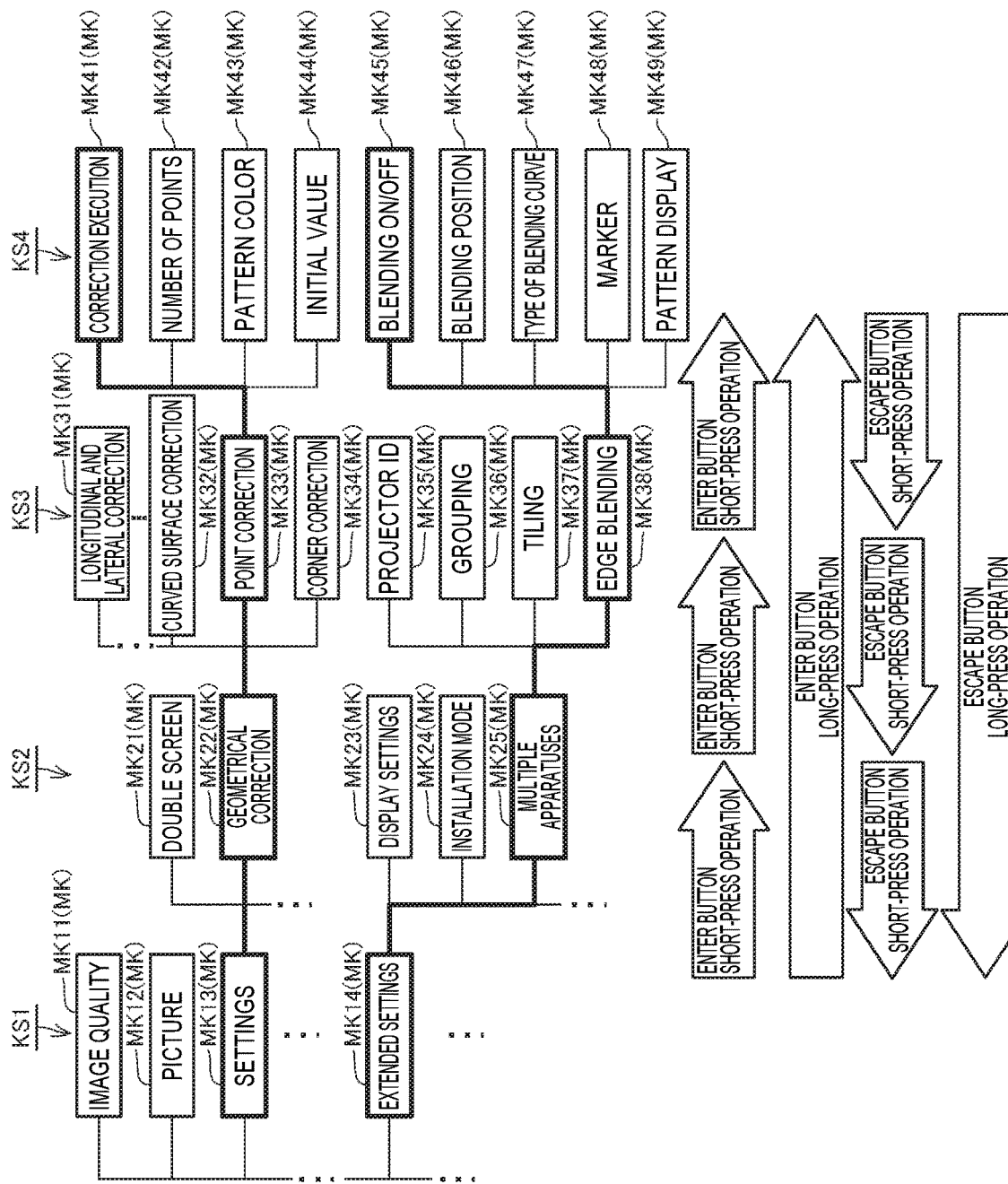
FIG. 5 shows a relationship between operations and layer transitions.

FIG. 5 shows a relationship between the operations on the enter button KB and the escape button TB and layer transitions corresponding to the operations. The layered structure and the menu items MK belonging to the respective layers shown in FIG. 5 are the same as those in FIG. 2. In FIG. 5, a route from the menu item MK13 to the menu item MK41 and a route from the menu item MK14 to the menu item MK45 are clearly shown by heavy lines.

When the menu button MB is operated, the control unit 170 of the projector 100 controls the projection unit 110 to display the OSD menu window on the screen SC. The OSD menu window displays the menu items MK belonging to the first layer KS1.

Here, it is assumed that the menu item MK 13 is selected from the menu items MK belonging to the first layer KS1 according to the operation of the direction button HB (step S9) and the enter button KB is short-press operated. The control unit 170 determines that the enter button KB has been short-press operated (step S3: "short-press operation"), displays the menu items MK belonging to the second layer KS2 formed by fine classification of the menu item MK13 (step S7). In the case of FIG. 5, the control unit 170 displays the menu items MK containing the menu items MK21, MK22, but not containing the menu items MK23, MK24, MK25. Then, the control unit 170 stores an operation sequence indicating that the menu item MK13 has been operated first in the memory unit 160 (step S8).

Here, it is assumed that, in the second layer KS2 formed by fine classification of the menu item MK13, the menu item MK22 is selected by the operation of the direction button HB (step S9) and the enter button KB is short-press operated. The control unit 170 determines that the enter button KB has been short-press operated (step S3: "short-press operation"), and displays the menu items MK belonging to the third layer KS3 formed by fine classification of the menu item MK22 (step S7). In the case of FIG. 5, the control unit 170 displays the menu items MK containing the menu items MK31, MK32, MK33, MK34, but not containing the menu items MK35, MK36, MK37, MK38. Then, the control unit 170 stores an operation sequence indicating that the menu items MK have been operated in the order of the menu item MK13 and the menu item MK22 in the memory unit 160 (step S8).

Further, it is assumed that, in the third layer KS3 formed by fine classification of the menu item MK22, the menu item MK33 is selected by the operation of the direction button HB (step S9) and the enter button KB is short-press operated. The control unit 170 determines that the enter button KB has been short-press operated (step S3: "short-press operation"), and displays the menu items MK belonging to the fourth layer KS4 formed by fine classification of the menu item MK33 (step S7). In the case of FIG. 5, the control unit 170 displays the menu items MK41, MK42, MK43, MK44. Then, the control unit 170 stores an operation sequence indicating that the menu items MK have been operated in the order of the menu item MK13, the menu item MK22, and the menu item MK33 in the memory unit 160 (step S8).

Here, in the fourth layer KS4 formed by fine classification of the menu item MK33, the menu item MK41 is selected by the operation of the direction button HB (step S9) and the enter button KB is short-press operated. The control unit 170 determines that the enter button KB has been short-press operated (step S3: "short-press operation") and further determines that there is no lower layer than the menu item MK41 (step S5: NO), and executes processing corresponding to the menu item MK41. That is, the control unit 170 executes the point correction. Then, the control unit 170 stores an operation sequence indicating that the menu items MK have been operated in the order of the menu item MK13, the menu item MK22, the menu item MK33, and the menu item MK41 in the memory unit 160 (step S8).

To select the menu item MK45 from the menu item MK41, it is necessary to transition the layer from the fourth layer KS4 to the first layer KS1 and once display the menu items MK belonging to the first layer KS1. The control unit 170 performs different transitions according to the operation on the escape button TB received by the operation unit 130 at the transition from the fourth layer KS4 to the first layer KS1. Note that the escape button TB is an example of a first button.

If the escape button TB is short-press operated when the menu items MK belonging to the fourth layer KS4 formed by fine classification of the menu item MK33 are displayed, the control unit 170 transitions the layer to the third layer KS3 next upper than the fourth layer KS4 and displays the menu items MK belonging to the third layer KS3 formed by fine classification of the menu item MK22 (step S13). In this manner, when the escape button TB is short-press operated, the control unit 170 transitions the layer to the next upper layer and displays the menu items MK belonging to the layer as the transition destination. The control unit 170 repeats the transition and the display, and thereby, transitions the layer from the fourth layer KS4 to the first layer KS1 and displays the menu items MK belonging to the first layer KS1.

Or, if the escape button TB is long-press operated when the menu items MK belonging to the fourth layer KS4 formed by fine classification of the menu item MK33 are displayed, the control unit 170 transitions the layer from the fourth layer KS4 to the first layer KS1 not via the third layer KS3 or the second layer KS2, and displays the menu items MK belonging to the first layer KS1 (step S14). In this manner, when the escape button TB is long-press operated, the control unit 170 transitions the layer to the uppermost layer and displays the menu items MK belonging to the uppermost layer as the transition destination.

As described above, while the menu items MK belonging to the lowermost layer are displayed, when the operation unit 130 receives the short-press operation on the escape button TB, the control unit 170 displays the menu items MK belonging to the middle layer. Or, while the menu items MK belonging to the lowermost layer are displayed, when the operation unit 130 receives the long-press operation on the escape button TB, the control unit 170 displays the menu items MK belonging to the uppermost layer.

Thereby, it is not necessary for the control unit 170 to move the layer one at a time for displaying the menu items MK belonging to the uppermost layer and the time taken to display the menu items MK belonging to the uppermost layer may be shortened. Further, the control unit 170 may display the menu items MK belonging to the different upper layers according to the operation received by the operation unit 130, and thereby, usability of the projector 100 for displaying the menu items MK belonging to the upper layer is improved.

To select the menu item MK45 belonging to the fourth layer KS4 by the operation button, it is necessary to transition the layer from the first layer KS1 to the fourth layer KS4 to which the menu item MK45 belongs. As described above, the control unit 170 performs the transition of the layer and the display of the menu items MK belonging to the layer as the transition destination at each time when the enter button KB is short-press operated. Thereby, the control unit 170 displays the menu items MK belonging to the second layer KS2 formed by fine classification of the menu item MK14, then, displays the menu items MK belonging to the third layer KS3 formed by fine classification of the menu item MK25, and then, displays the menu items MK belonging to the fourth layer KS4 formed by fine classification of the menu item MK45.

Here, it is assumed that the menu item MK 45 is selected by the operation of the direction button HB in the fourth layer KS4 formed by fine classification of the menu item MK38 and the enter button KB is short-press operated. The control unit 170 determines that the enter button KB has been short-press operated (step S3: "short-press operation") and further determines that there is no lower layer than the menu item MK45 (step S5: NO), and executes processing corresponding to the menu item MK45. That is, the control unit 170 switches on/off of the execution of the edge blending function.

Then, the control unit 170 stores an operation sequence indicating that the menu items MK have been operated in the order of the menu item MK14, the menu item MK25, the menu item MK38, and the menu item MK41 in the memory unit 160 (step S8). The operation sequence is stored with respect to each menu item MK belonging to the first layer KS1.

To select the menu item MK41 again from the menu item MK45, it is necessary to transition the layer from the fourth layer KS4 to the first layer KS1 and once display the menu items MK belonging to the first layer KS1. When the escape button TB is short-press operated, the control unit 170 transitions the layer to the upper layer one at a time and, when the escape button TB is long-press operated, transitions the layer to the uppermost layer.

To select the menu item MK41 again, it is necessary to transition the layer from the first layer KS1 to the fourth layer KS4 to which the menu item MK41 belongs. While the menu items MK belonging to the first layer KS1 are displayed, when the enter button KB is long-press operated, the control unit 170 performs a different layer transition from that of the above described short-press operation.

While the menu items MK belonging to the first layer KS1 are displayed and the menu item MK13 is selected, when the enter button KB is long-press operated, the control unit 170 reads the operation sequence corresponding to the menu item MK13 from the memory unit 160. Then, the control unit 170 displays the menu item MK belonging to the lowermost layer of the layers to which the layer transitions according to the read operation sequence. When the menu item MK41 is displayed again, the operation sequence indicating that the menu items MK have been operated in the order of the menu item MK13, the menu item MK22, the menu item MK33, and the menu item MK41 is stored in the memory unit 160. Therefore, the menu item MK belonging to the lowermost layer of the layers to which the layer transitions according to the read operation sequence is the menu item MK41. Accordingly, if the enter button KB is long-press operated, the control unit 170 transitions the layer from the first layer KS1 to the fourth layer KS4 to which the menu item MK41 belongs and displays the menu items MK belonging to the fourth layer KS4 (step S4).

As described above, while the menu items MK belonging to the uppermost layer are displayed, when the operation unit 130 receives the long-press operation on the enter button KB, the control unit 170 displays the menu item MK belonging to the lowermost layer based on the operation sequence stored in the memory unit 160.

Thereby, the control unit 170 may display the menu item MK belonging to the lowermost layer without moving the layer to the upper layer one at a time, and the time taken to display the menu item MK belonging to the lowermost layer may be shortened.

The memory unit 160 stores the operation sequence with respect to each uppermost menu item MK. Accordingly, the control unit 170 may display the menu items MK belonging to an appropriate lowermost layer with respect to each uppermost menu MK.

The long-press operation and the short-press operation are different operations on the enter button KB when the layer is moved to the lower layer and different operations on the escape button TB when the layer is moved to the upper layer. Accordingly, it is not necessary that the operation panel 131 includes operation buttons according to the formats of layer transition. Therefore, the cost of the projector 100 may be reduced with improved usability of the projector 100.

The layer transitions according to the operations on the enter button KB and the escape button TB are e.g. preferable layer transitions when one projection image is formed on the screen SC by a plurality of projector 100. In the point correction when one projection image is formed by a plurality of projector 100, in order to improve correction accuracy, the correction may be performed while switching of/off of the edge blending function. Here, as shown in FIGS. 3 and 5, when the respective menu item MK41 and menu item MK45 belong to the different fourth layers KS4, it is highly likely that many transitions to the uppermost layer and transitions to the lowermost layer occur. In this regard, as described above, the menu items MK belonging to the lowermost layer are displayed by the long-press operation of the enter button KB and the menu items MK belonging to the uppermost layer are displayed by the long-press operation of the escape button TB, and thereby, the time taken for the point correction may be shortened.

As described above, the projector 100 (image display apparatus) includes the projection unit 110 (display unit) that displays the menu items MK, the operation unit 130 that receives the operations, and the control unit 170 that allows the projection unit 110 to display the middle menu items MK (second menu items) belonging to the middle layer (second layer) when the operation unit 130 receives the operation of selecting the uppermost menu item MK (first menu item) belonging to the uppermost layer (uppermost first layer), and allows the projection unit 110 to display the lowermost menu items MK (third menu items) belonging to the lowermost layer (third layer) when the operation unit 130 receives the operation of selecting the middle menu item MK. While the projection unit 110 displays the lowermost menu items MK, when the operation unit 130 receives the short-press operation (first operation), the control unit 170 allows the projection unit 110 to display the middle menu items MK. Further, while the lowermost menu items MK are displayed, when the operation unit 130 receives the long-press operation (second operation), the control unit 170 allows the projection unit 110 to display the uppermost menu items MK.

According to the configuration, while the lowermost menu items MK are displayed, when the long-press operation is received, the uppermost menu items MK are displayed, and thereby, it is not necessary to wait for a lapse of a predetermined period or move the layer to the upper layer one at a time for displaying the uppermost menu items MK. Accordingly, the time taken to display the uppermost menu items MK may be shortened. Further, the operations received by the operation unit 130 are made different, and thereby, the menu items MK belonging to the different upper layers may be displayed and usability of the projector 100 for displaying the menu items MK belonging to the upper layers may be improved.

The projector 100 includes the memory unit 160 that stores the operation sequence in which the uppermost menu item MK, the middle menu item MK, and the lowermost menu item MK are operated. While the uppermost menu items MK are displayed, when the operation unit 130 receives the long-press operation, the control unit 170 allows the projection unit 110 to display the lowermost menu items MK according to the operation sequence stored by the memory unit 160.

According to the configuration, it is not necessary to move the layer to the lower layer one at a time for displaying the lowermost menu items MK according to the operation sequence stored by the memory unit 160, and thereby, the time taken to display the lowermost menu items MK may be shortened.

The memory unit 160 stores the operation sequence with respect to each uppermost menu item MK.

According to the configuration, the operation sequence is stored with respect to each uppermost menu item MK, and thereby, the menu item MK belonging to the appropriate lowermost layer may be displayed with respect to each uppermost menu item MK.

The long-press operation and the short-press operation are different operations on the same operation button.

According to the configuration, it is not necessary to provide operation buttons respectively corresponding to the long-press operation and the short-press operation, and the cost of the projector 100 may be reduced with improved usability of the projector 100.

The above described embodiments and modified examples are preferred embodiments of the invention. Note that the invention is not limited to those, but various modifications may be made within the range without departing from the scope of the invention.

For example, in the above described embodiments, the actions of the projector 100 according to the operations on the operation panel 131 are explained, however, the same actions may be executed by the operations on the remote 5.

For example, in the above described embodiments, the case where the projector 100 is the liquid crystal projector using the transmissive liquid crystal panel is explained, however, a projector using a reflective liquid crystal panel or digital mirror device may be employed.

For example, in the case where the control method of the above described projector 100 (the control method of the image display apparatus) is realized using a computer provided in the projector 100 or an external apparatus connected to the projector 100, the invention may be embodied in a form of a program executed by a computer for realizing the method, a recording medium in which the program is computer-readably recorded, or a transmission medium that transmits the program.

The functions of the above described respective functional blocks of the control unit 170 may be realized in a form of a memory medium in which programs are stored, a server apparatus that deliver the programs, a transmission medium that transmits the programs, data signals as embodiments of the programs within carrier waves, or the like. As the memory medium, various computer-readable media may be used, and magnetic, optical recording media or media using semiconductor memory devices may be used or other types of memory medium may be used. Or, a portable memory medium such as a memory card may be used. Or, the memory medium may be a memory medium provided in an apparatus connected to the above described apparatus via a communication line. The program may be mounted as a single application program operated on the operating system in an apparatus in which the operating system is mounted and operated. Or, not limited to the single application program, but the program may be mounted as a plurality of functions of an operating system, device driver, and application program.

The units of processing of the flowchart shown in FIG. 4 are formed by division according to the details of main processing for easy understanding of the processing of the control unit 170 of the projector 100. The invention is not restricted by the way of division and the name of the units of processing shown in the flowchart in FIG. 4. Further, the processing of the control unit 170 may be divided into more units of processing according to the details of the processing or divided so that the single unit of processing may contain more processing. Furthermore, the sequence of processing of the flowchart is not limited to the illustrated example.

The respective functional parts of the projector 100 shown in FIG. 1 show the functional configurations realized by cooperation of hardware and software, but the specific mounting form is not particularly limited. Therefore, the hardware individually corresponding to the respective functional parts are not necessarily mounted, but the functions of the plurality of functional parts may be obviously realized by a single processor executing programs. In the above described embodiments, part of the functions realized by software may be realized by hardware or part of the functions realized by hardware may be realized by software.

The image display apparatus according to the invention is not limited to the projector that projects an image on the screen SC. For example, the image display apparatus according to the invention includes various display apparatuses including a liquid crystal monitor or liquid crystal television that displays an image on a liquid crystal display panel, a monitor apparatus or television receiver that displays an image on a PDP (plasma display panel), a self-emitting display apparatus such as a monitor apparatus, or television receiver that displays an image on an organic EL display panel called OLED (Organic light-emitting diode) or OEL (Organic Electro-Luminescence).

What is claimed is:
1. An image display apparatus comprising:
a projector that functions as a display unit that displays a menu item and
an operation unit that receives an operation;
a processor that, when the operation unit receives an operation of selecting a first menu item belonging to an uppermost first layer, allows the display unit to display a second menu item belonging to a second layer lower than the first layer, and, when the operation unit receives an operation of selecting the second menu item, allows the display unit to display a third menu item belonging to a third layer lower than the second layer; and
a memory that stores an operation sequence in which the first menu item, the second menu item, and the third menu item are operated,
wherein, while the display unit displays the third menu item, when the operation unit receives a first operation, the processor allows the display unit to display the second menu item, and, while the third menu item is displayed, when the operation unit receives a second operation, the processor allows the display unit to display the first menu item,
while the first menu item is displayed, when the operation unit receives the second operation, the processor allows the display unit to display the third menu item according to the operation sequence stored by the memory, and the memory stores the operation sequence with respect to each first menu item.

2. The image display apparatus according to claim 1, wherein the first operation is an operation on a first button of the operation unit, and the second operation is an operation on the first button and different from the first operation.

3. A control method of an image display apparatus comprising:

when receiving an operation of selecting a first menu item belonging to an uppermost first layer, displaying a second menu item belonging to a second layer lower than the first layer;

when receiving an operation of selecting the second menu item, displaying a third menu item belonging to a third layer lower than the second layer;

when receiving a first operation while displaying the third menu item, displaying the second menu item, and, when receiving a second operation while displaying the third menu item, displaying the first menu item;

storing an operation sequence in which the first menu item, the second menu item and the third menu item are operated; and when receiving the second operation while displaying the first menu item, displaying the third menu item according to the stored operation sequence, wherein the operation sequence is stored with respect to each first menu item.

4. The control method of the image display apparatus according to claim 3, wherein the first operation is an operation on a first button, and the second operation is an operation on the first button and different from the first operation.

5. A non-transitory computer-readable storage medium storing a program to be executed by a processor of an image display apparatus including a projector, the projector functioning as a display unit that displays a menu item and an operation unit that receives an operation, the program allowing the processor to, when the operation unit receives an operation of selecting a first menu item belonging to an uppermost first layer, allow the display unit to display a second menu item belonging to a second layer lower than the first layer, and, when the operation unit receives an operation of selecting the second menu item, allow the display unit to display a third menu item belonging to a third layer lower than the second layer;

while the display unit displays the third menu item, when the operation unit receives a first operation, allow the display unit to display the second menu item, and, while the third menu item is displayed, when the operation unit receives a second operation, allow the display unit to display the first menu item;

storing an operation sequence in which the first menu item, the second menu item, and the third menu item are operated; and when receiving the second operation while displaying the first menu item, displaying the third menu item according to the stored operation sequence, wherein the operation sequence is stored with respect to each first menu item.

\* \* \* \* \*